June 17, 1947.  S. W. SEVERANCE  2,422,440
PARACHUTE AND ELASTIC SUSPENSION LINE
Filed April 19, 1945
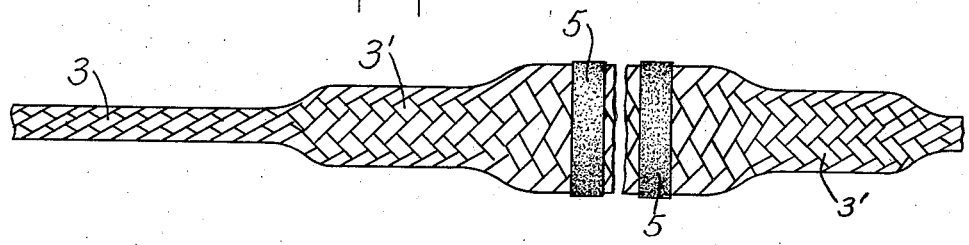
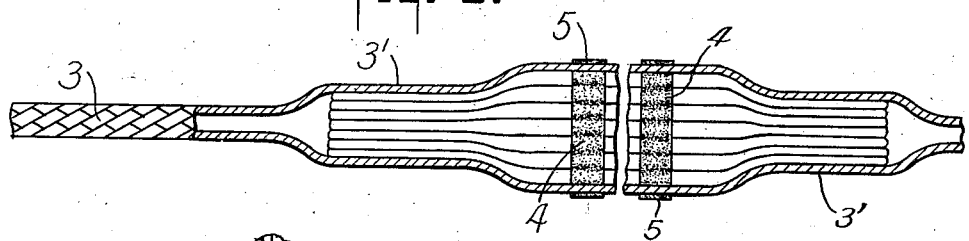
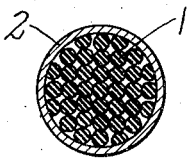
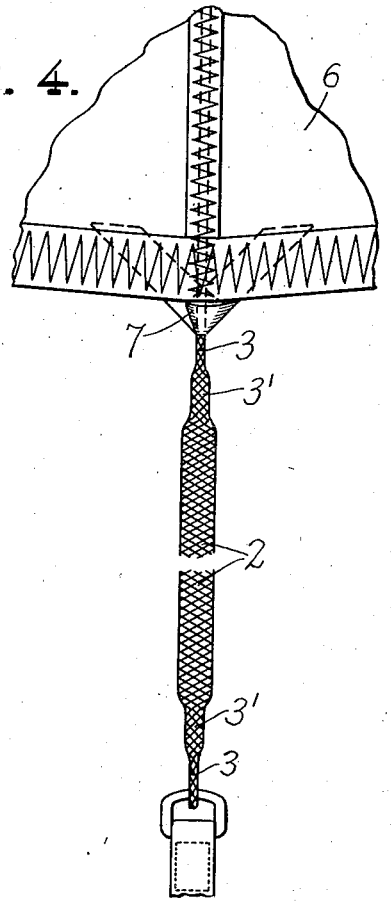
INVENTOR
Spencer W. Severance
BY
Blair, Curtis + Hayward
ATTORNEYS Patented June 17, 1947

2,422,440

UNITED STATES PATENT OFFICE 2,422,440

PARACHUTE AND ELASTIC SUSPENSION LINE

Spencer W. Severance, Trenton, N. J., assignor to Stanley Switlik, Trenton, N. J.

Application April 19, 1945, Serial No. 589,174

8 Claims. (Cl. 244—145)

This invention relates to an elastic line and to parachutes.

An object of the invention resides in the provision of an elastic line that may be attached at its ends to means that exert forces in opposite directions, and which is so constructed that it will properly absorb the forces repeatedly, without losing its form or effectiveness.

A further object of the invention resides in the provision of means for attaching the line in such manner that the elastic portion of the line will be seized with increasing effectiveness as the forces applied to its ends increase in magnitude.

A further object of the invention resides in the combination of a parachute canopy, harness and suspension lines wherein the shock of opening of the canopy will be cushioned, and wherein the elastic portions of the lines will be so attached to the canopy and harness that there will be no tendency for the same to fracture due to their attachment.

A further object of the invention resides in the method of producing the elastic line.

With these and other objects in view, which will appear as my description progresses, my invention resides in the combination and arrangement of parts herein described and recited in the claims.

In the drawing:

Figure 1 is an elevation of a line constructed in accordance with my invention;

Figure 2 is a longitudinal section thereof;

Figure 3 is a transverse section; and

Figure 4 is an elevation showing the manner of attaching the line to the parachute canopy and to the load carrying harness.

The embodiment of the elastic line that I have disclosed to illustrate this phase of my invention includes an elastic core 1 and a braided cover 2, the cover having terminal portions 3 that extend beyond the ends of the core and constricted portions 3' that embrace the end portions of the core. In producing this elastic line I assemble a plurality of elastic strands, preferably of rubber and each preferably of substantially the same elasticity as the others, in substantially parallel relation. This embryo core is then stretched by a pull applied adjacent its ends so that the elastic strands are put under some tension and the effective diameter of the core is somewhat reduced.

While in this condition the strands are preferably seized together at points somewhat removed from their ends by any suitable means as, for instance, by an adhesive 4. While still in this stretched condition with the reduced diameter of the core the cover is braided on the core so that it snugly fits the core at least between the points of seizing, the degree of snugness being controlled by the elongation that is desired in the finished line. The braiding is constituted by any suitable material such as cotton, nylon or the like, and the form of the braiding is such that it will expand longitudinally as the core is elongated without placing any undue strain upon this portion of the cover. Such forms of braiding are well known and it is not thought necessary to here describe them in detail.

While the core is still in its stretched condition the braiding is continued over the portions of the core beyond the points of seizing to a sufficient degree to form core free extensions such as are indicated at 3 in the drawing.

At points somewhat removed inwardly from the ends of the core the number of picks of the braid is reduced and this reduction continues into the extensions. The result of this will be that the portions of the cover of a reduced number of picks will seize the end portions of the core at 3' to a greater degree than that with which the intermediate portion is seized, and as pulling forces are applied to the extensions of the cover the seizing of the core adjacent its ends as at 3' by the cover will increase in intensity.

I also contemplate in one phase of my invention the seizing of the cover to the core, at points removed from the ends of the core and in advance of the reduced pick portion of the cover, by suitable means such as an adhesive, 5, which will be applied to the cover and penetrate the core while the core is still in its stretched condition and after the cover has been applied and either with or without first seizing the strands of the core together.

When the stretching force that is applied during the seizing hereinabove referred to and during the application of the cover is relieved the core will, of course, tend to expand, but the form of the braided cover is such that the expansion will not be permitted to any appreciable degree, with the result that the effective diameter of the core will be restricted by the cover and the core that is made up of the several strands will be maintained as a unitary operative structure.

This method produces a line which includes a core that is made up of a plurality of strands of elastic material, which strands are seized together adjacent their ends and which core is encased in a braided cover that is so constructed that it restricts the radial expansion of the core and consequently maintains it under compression. The line thus formed includes, as well, cover portions that encase the core from their ends for a distance inwardly and which portions are of lesser picks than the remainder of the cover, thus holding the core under greater compression at these areas than at the intermediate portions. Consequently when pulling forces are applied to the extended ends of the cover the portions of the core adjacent the ends, as at 3', will be gripped tightly by the constricting of the cover at the points where it is of lesser picks than at its intermediate point, and this seizing of the core by the cover will increase as the pulling force on the extensions of the cover increases. However, the intermediate portion of the core, with its cover, will be free to stretch, and, because of the pressure applied to the core by the cover between its ends and the seizing of the cover to the core, the stretching will be as a unit as will also be the contraction.

It is, of course, to be realized that the amount of longitudinal expansion of the braided cover is dependent upon how closely the threads of the cover approach the transverse of the core in their initial positions and the core will be limited in its stretching action only when and if these threads reach a position parallel with the longitudinal axis of the core.

In the drawings I have also illustrated the combination of such a line with a parachute canopy in which the canopy is indicated by the reference numeral 6. In this arrangement the extensions of the line are secured to the canopy as, for instance, by zigzag stitching, and may be secured at the seam and extend partly upward thereof, or completely upwardly of the seam and even over the vent of the canopy in the manner heretofore known. The extension of the line which is free from the rubber core projects slightly beyond the edge of the skirt of the canopy, thus providing a portion for the reception of a reinforcement 7 which may be in the form of a tape that embraces the line and is stitched to the canopy and to the extension of the line. The extension on the other end of the line is secured to the load carrying harness in the usual manner.

Thus in this construction the lines have the beneficial effect of elasticity to cushion the shock of opening of the parachute, for instance, and yet they are secured to the load carrying harness at points removed from the ends of the elastic core so that the elastic will be subjected to no shearing forces.

While I have illustrated and described certain embodiments of my invention, I do not wish to be limited to the details of those embodiments except in so far as such limitation is made necessary by the claims.

For instance, I contemplate the use of an elastic line of the type hereinabove set forth wherein the elastic portion may greatly vary in length and wherein the braided portion that extends beyond the elastic portion may greatly vary in length, and wherein the ratio between the length of the elastic portion and the length of the extended braided portion may greatly vary. In the use of the elastic cord as in a parachute suspension line it is, of course, obvious that the elastic portion may be substantially the full length of the line with the extended braided portions 3 relatively short, or that the latter may be relatively long and the elastic portion relatively short.

I claim:

1. A line comprising a core constituted by a plurality of elastic strands arranged in a bundle with the strands in substantial parallelism, an extensible braided cover surrounding said core and exerting compressible force on the core when the core is unextended, the ends of said braided cover extending beyond the ends of the core, and a seizing removed inwardly from each end of the core and binding the strands of the core together, the portions of the cover between the seizings and the ends of the core being of lesser picks than the remainder of the cover whereby when pulling forces are applied to the extended portions of the cover and seizing effect of the cover on the end portions of the core will increase.

2. A line comprising a core constituted by a plurality of elastic strands arranged in a bundle with the strands in substantial parallelism, an extensible braided cover surrounding said core and exerting compressible force on the core when the core is unextended, the ends of said braided cover extending beyond the ends of the core, and seizings removed inwardly from the ends of the core and binding the core and cover together, the portions of the cover between the seizings and the ends of the core being of lesser picks than the remainder of the cover whereby when pulling forces are applied to the extended portions of the cover the seizing effect of the cover on the end portions of the core will increase.

3. A line comprising a core constituted by a plurality of elastic strands arranged in a bundle with the strands in substantial parallelism, an extensible braided cover surrounding said core and exerting compressive force on the core when the core is unextended, the ends of said braided cover being extended beyond the ends of the core, the portions of the braided cover adjacent the ends of the core being of lesser diameter than the remainder of the cover whereby when pulling forces are applied to the extended portions of the cover the portions of the cover of lesser diameter will seize the ends of the core with increasing effectiveness as the pulling force is increased.

4. In combination with a parachute canopy and harness, a suspension line including an elastic core, a cover for said core consisting of a braided textile having extensions beyond the ends of the core and means for securing the extension from one end of the core to the canopy, and means securing the extension at the other end of the core to the load carrying harness.

5. In combination with a parachute canopy and harness, a suspension line including an elastic core, a cover for said core consisting of a braided textile having extensions beyond the ends of the core and means for securing the extension from one end of the core to the canopy, and means securing the extension at the other end of the core to the load carrying harness, the cover being seized to the core adjacent the ends of the latter.

6. In combination with a parachute canopy and harness, a suspension line including an elastic core, a cover for said core consisting of a braided textile having extensions beyond the ends of the core and means for securing the extension from one end of the core to the canopy and means securing the extension at the other end of the core to the load carrying harness, the cover being seized to the core adjacent the ends of the latter, and the end portions of the cover that surround the core beyond said points of seizing being braided and compressively seizing the end portions of the core.

7. The method of forming an elastic line which includes grouping a plurality of elastic strands in substantial parallelism, stretching the thus grouped strands, braiding a cover snugly over the group of strands with the number of picks per inch less adjacent the ends of the group of strands than at the intermediate portion, extending the cover beyond the ends of the group of strands and seizing the group of strands and the cover and the group of strands together at points removed from the ends of the group.

8. The combination with a parachute canopy and harness of suspension lines attached to said canopy and to said harness, each of said suspension lines including an extensible fabric cover member and an elastic shock absorbing member within said fabric member and terminating short of the end thereof and of the attachment of the suspension member to both the harness and the canopy.

SPENCER W. SEVERANCE.

REFERENCES CITED

The following references are of record in the file of this patent:

UNITED STATES PATENTS

| Number | Name | Date |
|---|---|---|
| 487,042 | Ziegler | Nov. 29, 1892 |
| 1,948,844 | Dawes | Feb. 27, 1934 |
| 1,842,450 | Hoffman | Jan. 26, 1932 |

FOREIGN PATENTS

| Number | Country | Date |
|---|---|---|
| 1,235 | Great Britain | 1880 |
| 466,642 | Germany | Oct. 10, 1928 |
| 553,653 | France | Feb. 14, 1923 |
| 30,865 | France | June 22, 1926 |
| | Addl. to No. 553,563 | |